United States Patent
Yokoe et al.

(10) Patent No.: US 10,698,210 B2
(45) Date of Patent: Jun. 30, 2020

(54) HEAD-UP DISPLAY DEVICE AND COLD MIRROR

(71) Applicant: DENSO CORPORATION, Kariya, Aichi-pref. (JP)

(72) Inventors: Junya Yokoe, Kariya (JP); Takahiro Nambara, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 16/307,077

(22) PCT Filed: Apr. 27, 2017

(86) PCT No.: PCT/JP2017/016678
§ 371 (c)(1),
(2) Date: Dec. 4, 2018

(87) PCT Pub. No.: WO2017/212818
PCT Pub. Date: Dec. 14, 2017

(65) Prior Publication Data
US 2019/0227308 A1    Jul. 25, 2019

(30) Foreign Application Priority Data

Jun. 6, 2016   (JP) ................................ 2016-112822

(51) Int. Cl.
*G02B 27/01*       (2006.01)
*B60K 35/00*      (2006.01)
*G02B 5/28*        (2006.01)

(52) U.S. Cl.
CPC .......... *G02B 27/0101* (2013.01); *B60K 35/00* (2013.01); *G02B 5/28* (2013.01);
(Continued)

(58) Field of Classification Search
CPC ...... G02B 27/0101; G02B 5/28; G02B 5/282; G02B 27/01; G02B 2027/0112;
(Continued)

(56) References Cited

U.S. PATENT DOCUMENTS

2014/0292834 A1* 10/2014 Ando ........................ G09G 3/20
                                                                345/690
2016/0062121 A1*  3/2016 Border ................... G02B 5/003
                                                                359/630
(Continued)

FOREIGN PATENT DOCUMENTS

JP   2003344801 A   12/2003
JP   2017090822 A    5/2017

*Primary Examiner* — Chong Wu
(74) *Attorney, Agent, or Firm* — Harness, Dickey & Pierce, P.L.C.

(57) ABSTRACT

A light guide unit has a cold mirror unit to guide display light toward a projection window. In an XYZ color system, a wavelength region between a wavelength at which a value of a color matching function Z is maximum and a wavelength at which a value of the color matching function Y is maximum is a first wavelength region, and a wavelength region between a wavelength at which a value of a color matching function Y is maximum and a wavelength at which a value of a color matching function X is maximum is a second wavelength region. A minimum reflectance of the cold mirror unit to the display light takes a minimum value among reflectances of the respective wavelengths in a corresponding wavelength region. The minimum reflectance in the second wavelength region is larger than the minimum reflectance in the first wavelength region.

9 Claims, 10 Drawing Sheets

(52) U.S. Cl.
CPC ............ *G02B 5/282* (2013.01); *G02B 27/01* (2013.01); *B60K 2370/1529* (2019.05); *B60K 2370/23* (2019.05); *B60K 2370/31* (2019.05); *B60K 2370/334* (2019.05); *B60K 2370/336* (2019.05); *G02B 2027/0112* (2013.01); *G02B 2027/0118* (2013.01)

(58) Field of Classification Search
CPC ............ G02B 2027/0118; B60K 35/00; B60K 2370/1529; B60K 2370/31; B60K 2370/336; B60K 2370/23; B60K 2370/334
See application file for complete search history.

(56) References Cited

U.S. PATENT DOCUMENTS

| | | |
|---|---|---|
| 2017/0139206 A1 | 5/2017 | Sugikawa |
| 2017/0146897 A1* | 5/2017 | Okamoto ............ G03B 21/2033 |
| 2019/0162961 A1* | 5/2019 | Yokoe .................. G02B 5/28 |

* cited by examiner

| | | Air | |
|---|---|---|---|
| 44 { | 44a | SiO2 | 211 |
| | 44a | TiO2 | 54 |
| | 44a | SiO2 | 87 |
| | 44a | TiO2 | 61 |
| | 44a | SiO2 | 100 |
| | 44a | TiO2 | 57 |
| | 44a | SiO2 | 73 |
| | 44a | TiO2 | 240 |
| | 44a | SiO2 | 76 |
| | 44a | TiO2 | 32 |
| | 44a | SiO2 | 138 |
| 43 | | Substrate (Glass 1.9mm) | |

40, 42

HEAD-UP DISPLAY DEVICE AND COLD MIRROR

CROSS REFERENCE TO RELATED APPLICATIONS

This application is a U.S. National Phase Application under 35 U.S.C. 371 of International Application No. PCT/JP2017/016678 filed on Apr. 27, 2017. This application is based on and claims the benefit of priority from Japanese Patent Application No. 2016-112822 filed on Jun. 6, 2016. The entire disclosures of all of the above applications are incorporated herein by reference.

TECHNICAL FIELD

The present disclosure relates to a head-up display device (hereinafter, abbreviated HUD device) and a cold mirror for the HUD device.

BACKGROUND ART

Heretofore, there has been known an HUD device which is mounted on a movable object and displays a virtual image viewable by an occupant by projecting a display light onto a projection member through a projection window. The HUD device disclosed in Patent Literature 1 includes a display light projection unit that projects an image as a display light including multiple wavelengths in a visible region, and a light guide unit that guides display light from the display light projection unit to a projection window. The light guide unit has a cold mirror unit for reflection of a display light with the use of an optical multilayer film.

In this example, the cold mirror unit has a high reflectance in 450 to 480 nm, 530 to 560 nm, and 610 to 640 nm, and has a low reflectance in other wavelength regions of a visible light. In particular, there are wavelengths having two minimum reflectances around 510 nm and around 590 nm, and the two minimum reflectances are set at approximately 50% which are substantially equal to each other. An external light of sunlight or the like that enters the HUD device through a projection window from an external of HUD unit may be restricted from being reflected by the cold mirror unit and reaching a display light projection unit. In other words, a decrease in a lifetime due to a rise in a temperature of the display light projection unit may be reduced.

However, in the case of employing the cold mirror unit of Patent Literature 1, there is a concern that a display quality of a virtual image may be lowered due to a decrease in luminance and a change in chromaticity.

PRIOR ART LITERATURE

Patent Literature

PATENT LITERATURE 1: JP 2003-344801 A

SUMMARY OF INVENTION

It is an object of the present disclosure to provide an HUD device and a cold mirror to produce a high display quality.

Incidentally, the present inventors have carried out a detailed examination on how to set reflectance of a cold mirror unit from the viewpoint of enhancing a display quality of the virtual image. The present inventors have found that the reflectance of the cold mirror unit should be set in consideration of color matching functions X, Y, and Z in an XYZ color system.

Specifically, a wavelength region between a wavelength having a maximum value of the color matching function Z and a wavelength having a maximum value of the color matching function Y as a first wavelength region is compared with a wavelength region between a wavelength having the maximum value of the color matching function Y and a wavelength having a maximum value of the color matching function X as a second wavelength region. As a result of the comparison, it has been found that both of the degree of influence on the luminance of the virtual image in the second wavelength region and the degree of influence on the chromaticity of the virtual image tend to be relatively larger than those in the first wavelength region.

When the cold mirror unit of Patent Literature 1 is considered again based on the above knowledge, the minimum reflectances in the vicinity of 510 nm belonging to the first wavelength region and in the vicinity of 590 nm belonging to the second wavelength region is set to approximately 50% which is substantially equal to each other. In other words, since the display light in the second wavelength region having a large degree of influence on the virtual image is not reflected relatively larger than that of the first wavelength region, the display light in the second wavelength region which should contribute to the display of the virtual image is hardly guided. Therefore, in the case of employing the cold mirror unit of Patent Literature 1, there is a concern that a display quality of a virtual image may be lowered due to a decrease in luminance and a change in chromaticity.

According to an aspect of the present disclosure, a head-up display device is configured to be mounted on a movable object and to project a display light through a projection window onto a projection member to display a virtual image visually recognizable by an occupant. The head-up display device comprises a display light projection unit configured to project an image as a display light, which includes a plurality of wavelengths, in a visible region. The head-up display device further comprises a light guide unit configured to guide the display light from the display light projection unit toward the projection window. The light guide unit includes a cold mirror unit configured to reflect the display light with an optical multilayer film. In an XYZ color system, a wavelength region between a wavelength having a maximum value of a color matching function Z and a wavelength having a maximum value of a color matching function Y is defined as a first wavelength region, and a wavelength region between the wavelength having the maximum value of the color matching function Y and a wavelength having a maximum value of the color matching function X is defined as a second wavelength region. A reflectance of the cold mirror unit to the display light, which takes a minimum value among reflectances of the respective wavelengths in a subject wavelength region, is defined as a minimum reflectance. The minimum reflectance in the second wavelength region is larger than the minimum reflectance in the first wavelength region.

According to an aspect of the present disclosure, a head-up display device is configured to be mounted on a movable object and to project a display light through a projection window onto a projection member to display a virtual image visually recognizable by an occupant. The head-up display device comprises a display light projection unit configured to project an image as a display light, which includes a plurality of wavelengths, in a visible region. The head-up display device further comprises a light guide unit configured to guide the display light from the display light projection unit toward the projection window. The light guide unit includes a cold mirror unit configured to reflect the display light with an optical multilayer film. In an XYZ color system, a wavelength, which is intermediate between the wavelength at which a value of a color matching function Z is maximum and a wavelength at which a value of the color matching function Y is maximum, is defined as a first intermediate wavelength, and a wavelength, which is intermediate between the wavelength at which the value of the color matching function Y is maximum and a wavelength at which a value of a color matching function X is maximum, is defined as a second intermediate wavelength. Among reflectances of the cold mirror unit to the display light, a reflectance at the second intermediate wavelength is larger than a reflectance at the first intermediate wavelength.

According to an aspect of the present disclosure, a cold mirror is configured to display an image. The cold mirror comprises a mirror substrate. The cold mirror comprises an optical multilayer film formed on a surface of the mirror substrate and configured to reflect a part of an incident light and to block the other part from an optical path. In an XYZ color system, a wavelength region between a wavelength having a maximum value of a color matching function Z and a wavelength having a maximum value of a color matching function Y is defined as a first wavelength region, and a wavelength region between the wavelength having the maximum value of the color matching function Y and a wavelength λxm having a maximum value of the color matching function X is defined as a second wavelength region. A minimum reflectance, which takes a minimum value among reflectances of the respective wavelengths in a subject wavelength region, is defined. The minimum reflectance in the second wavelength region is larger than the minimum reflectance in the first wavelength region.

According to an aspect of the present disclosure, a cold mirror is configured to display an image. The cold mirror comprises a mirror substrate. The cold mirror further comprises an optical multilayer film formed on a surface of the mirror substrate and configured to reflect a part of an incident light and to block the other part from an optical path. In an XYZ color system, a wavelength that is intermediate between a wavelength at which a value of a color matching function Z is maximum and a wavelength at which a value of a color matching function Y is maximum is defined as a first intermediate wavelength, and a wavelength that is intermediate between the wavelength at which the value of the color matching function Y is maximum and a wavelength at which a value of a color matching function X is maximum is defined as a second intermediate wavelength. Among reflectances to the incident light, the reflectance at the second intermediate wavelength is larger than the reflectance at the first intermediate wavelength.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
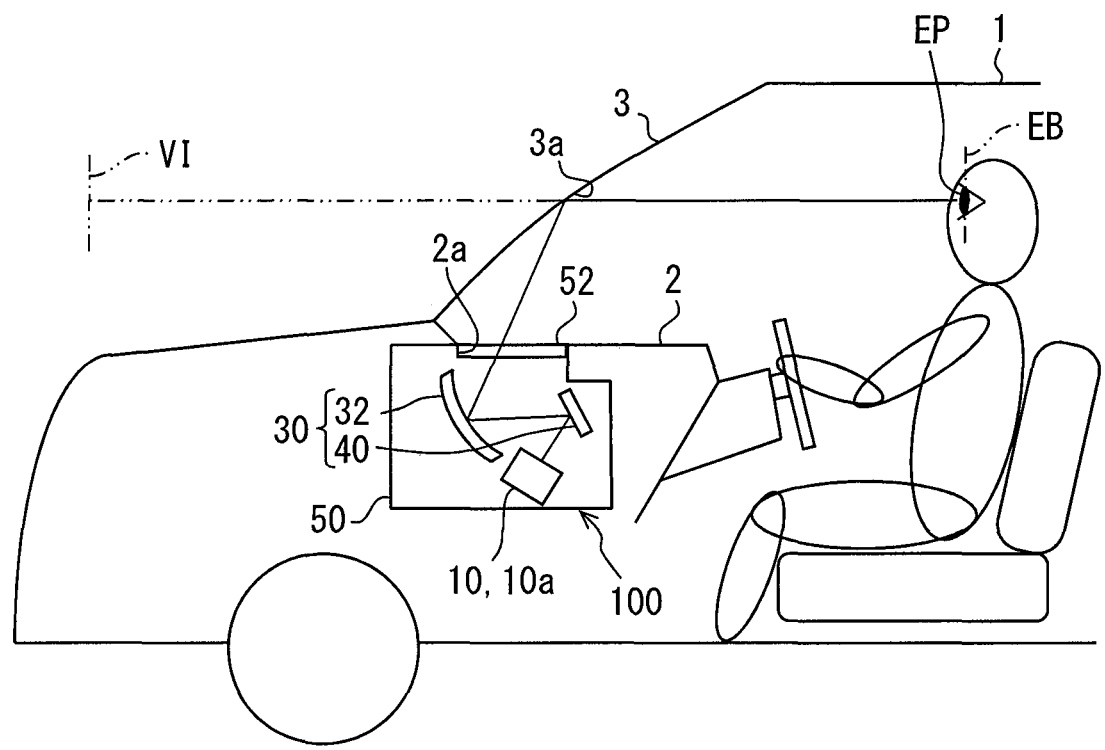
FIG. 1 is a diagram showing a state in which an HUD device is mounted on a vehicle according to the first embodiment.

Hereinafter, multiple embodiments of the present disclosure will be described with reference to the drawings. It should be noted that the same reference numerals are assigned to the corresponding components in the respective embodiments, so that repetitive descriptions may be omitted. In the case where only a part of a configuration is described in each embodiment, the rest of the configuration may be applied to a configuration of other embodiments previously described. Further, not only the combinations of the configurations explicitly shown in the description of the respective embodiments, but also the configurations of the multiple embodiments may be partially combined with each other even if the combinations are not explicitly shown if there is no issue in the combinations in particular.

First Embodiment

As shown in FIG. 1, an HUD device 100 according to a first embodiment of the present disclosure is mounted on a vehicle 1, which is a type of a movable object, and is accommodated in an instrument panel 2. The HUD device 100 projects a display light through a projection window 2a provided on an upper surface portion of the instrument panel 2 onto a windshield 3 as a projection member of the vehicle 1. The display light is reflected on the windshield 3, and the HUD device 100 displays a virtual image of the image that may be viewed by an occupant of the vehicle 1. In other words, the display light reflected by the windshield 3 reaches a visual recognition region EB set in an interior of the vehicle 1, as a result of which an occupant whose eye point EP is positioned within the visual recognition region EB perceives the display light as a virtual image VI. The occupant is capable of recognizing various types of information by the virtual image VI. Examples of various types of information which is displayed as the virtual image of the image include state values of the vehicle 1 such as a vehicle speed and a remaining fuel level, or navigation information such as road information and visibility auxiliary information.

The windshield 3 of the vehicle 1 is formed in a plate-shape and made of a light transmissive glass or a synthetic resin. In the windshield 3, a projection surface 3a onto which the display light is projected is formed in a smooth concave surface shape or a flat surface shape. As the projection member, instead of the windshield 3, a combiner that is separate from the vehicle 1 may be installed inside the vehicle 1, and the image may be projected onto the combiner. Further, the HUD device 100 per se may include a combiner as a projection member.

The visual recognition region EB is a region in which a virtual image VI displayed by the HUD device 100 is clearly visible. Usually, the visual recognition region EB is provided so as to overlap with an eyelips set in the vehicle 1. The eyelips is set based on an eye range that statistically represents the distribution of eye points of a driver as an occupant (in detail, refer to JISD0021: 1998).

A specific configuration of the HUD device 100 described above will be described below with reference to FIG. 2. The HUD device 100 includes a display light projection unit 10 and a light guide unit 30. The display light projection unit 10 and the light guide unit 30 are housed in a housing 50 of the HUD device 100.

Figure 2:
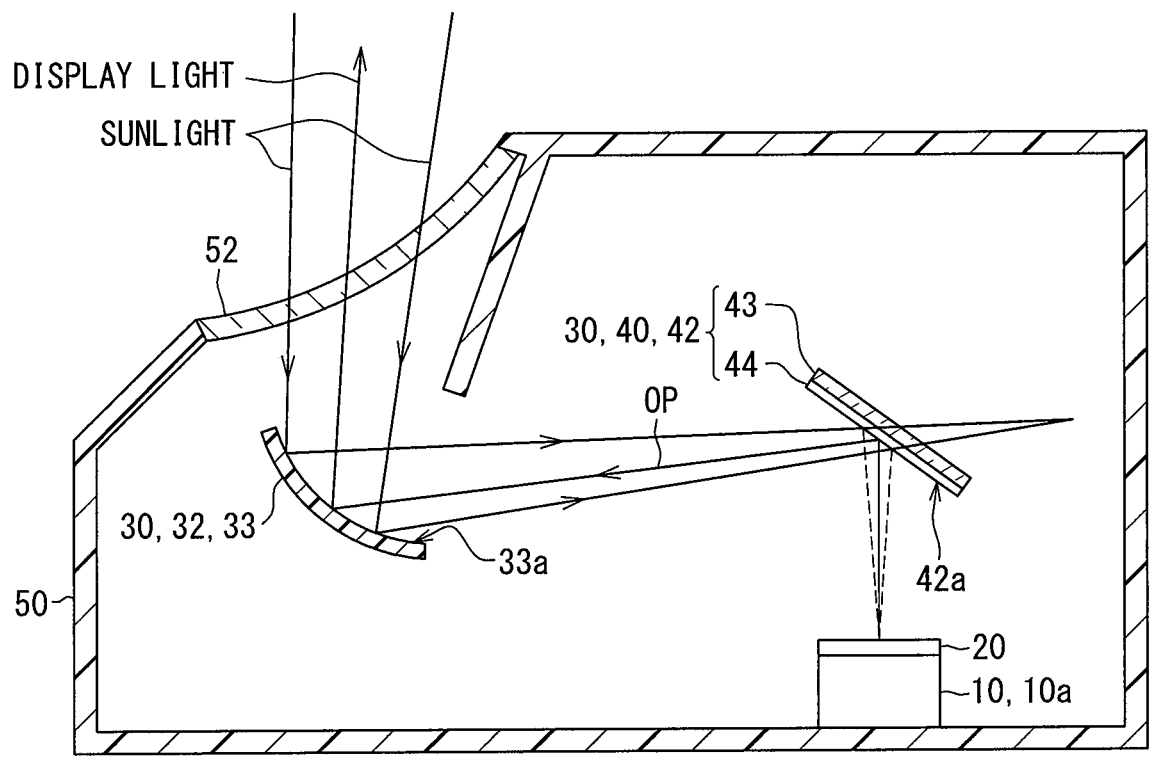
FIG. 2 is a diagram showing a schematic configuration of the HUD device according to the first embodiment.
Figure 3:
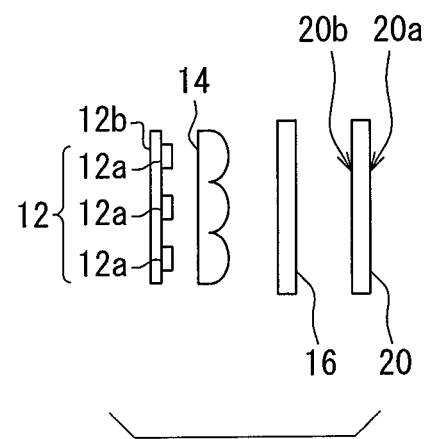
FIG. 3 is a diagram showing a display light projection unit according to the first embodiment.

As shown in FIGS. 2 and 3, the display light projection unit 10 includes a light source 12, a condenser lens 14, a field lens 16, and a liquid crystal panel 20, and is formed by accommodating those components in a box-shaped casing 10a, for example.

The light source 12 is configured, for example, an array of multiple light emitting devices 12a. The light emitting devices 12a in the present embodiment is light emitting diode devices which are located on a light source circuit board 12b and are connected to a power source through a wiring pattern on the light source circuit board 12b. Each light emitting device 12a emits a light with a light emission amount corresponding to a current amount by energization. More specifically, in each of the light emitting devices 12a, for example, a blue light emitting diode is covered with a phosphor, to thereby produce a light emission with pseudo white. In the present embodiment, the three light emitting devices 12a are provided.

The condenser lens 14 and the field lens 16 are located between the light source 12 and the liquid crystal panel 20. The condenser lens 14 is made of, for example, synthetic resin or glass and has a light transmissive property. In particular, the condenser lens 14 according to the present embodiment is a lens array in which multiple convex lens elements are arrayed according to the number and placement of the light emitting devices 12a. The condenser lens 14 condenses the light incident from the light source 12 side and emits the condensed light toward the field lens 16 side.

The field lens 16 is located between the condenser lens 14 and the liquid crystal panel 20, and is made of a synthetic resin, glass or the like to have a light transmissive property. In particular, the field lens 16 according to the present embodiment is a Fresnel lens formed in a plate-like shape. The field lens 16 further condenses the light incident from the condenser lens 14 side and emits the condensed light toward the liquid crystal panel 20 side.

The liquid crystal panel 20 according to the present embodiment is configured by a liquid crystal panel formed of a thin film transistor (TFT) and includes, for example, an active matrix liquid crystal panel formed of multiple liquid crystal pixels that are arrayed in two directions.

Figure 4:
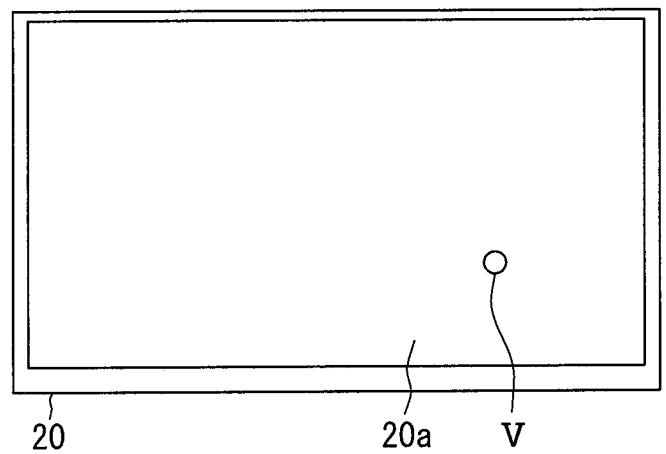
FIG. 4 is a diagram showing the display light projection unit from a light guide unit side according to the first embodiment.
Figure 5:
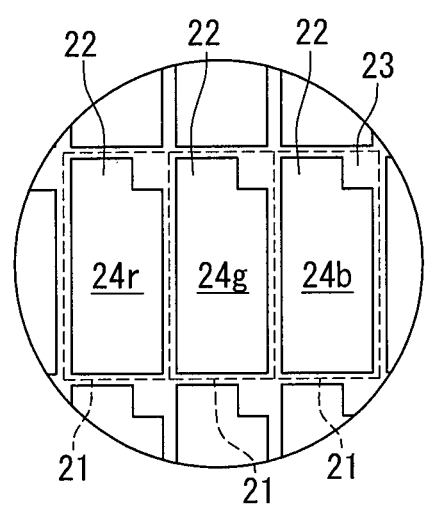
FIG. 5 is a diagram showing an expanded V portion in FIG. 4.

Specifically, as shown in FIG. 4, the liquid crystal panel 20 has a rectangular shape having a longitudinal direction and a short direction. As shown in FIG. 5, since the liquid crystal pixels 21 are arranged in the longitudinal direction and the short direction, a display surface 20a that emits an image as a display light on the light guide unit 30 side also has a rectangular shape. In each liquid crystal pixel 21, a transmissive portion 22 penetrating through the display surface 20a in a normal direction and a wiring portion 23 formed so as to surround the transmissive portion 22 are provided.

Since the liquid crystal panel 20 is formed by laminating a pair of polarizing plates and a liquid crystal layer sandwiched between the pair of polarizing plates, the image display panel 20 has a plate-like shape. Each polarizing plate has a property of transmitting a light polarized in a predetermined direction and absorbing a light polarized in a direction perpendicular to the predetermined direction, and the pair of polarizing plates are located such that the predetermined directions are orthogonal to each other. The liquid crystal layer can rotate a polarization direction of the light incident on the liquid crystal layer according to an applied voltage by applying the voltage for each liquid crystal pixel. A ratio of the light transmitted through the polarizing plate on the light guide unit side due to the rotation of the polarization direction, that is, a transmittance may be changed at any time.

Therefore, the liquid crystal panel 20 controls the transmittance of each liquid crystal pixel 21 with respect to the incidence of the light from the field lens on an illumination target surface 20b which is a surface on the light source 12 side. In other words, the liquid crystal panel 20 forms an image in accordance with the illumination from the light source 12 side so that the image may be emitted as the display light. The display light in the present embodiment is projected as a light polarized in a polarization direction which is inclined at 45 degrees relative to a longitudinal direction of the liquid crystal panel 20.

Color filters 24r, 24g, and 24r of mutually different colors (for example, red, green, and blue) are provided in adjacent liquid crystal pixels 21, and various colors are produced by the combinations of those color filters.

Figure 6:
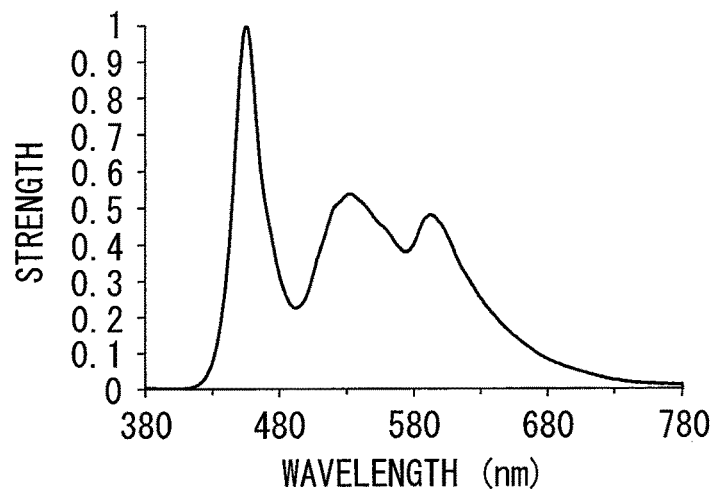
FIG. 6 is a graph showing a spectrum of a display light immediately after being projected from a display light projection unit according to the first embodiment.

With the liquid crystal panel 20, the display light projection unit 10 can project an image as the display light with spectrum corresponding to the emission spectrum of the light source 12 and the transmittance characteristics of color filters 24r, 24g, and 24b. FIG. 6 shows the spectrum of the display light projected by the display light projection unit 10 when the transmittance of all the liquid crystal pixels 21 is maximized in terms of performance in the present embodiment. The spectrum of the display light including the multiple wavelengths has local maximum values at about 450 nm, about 530 nm, and about 600 nm, and local minimum values at about 500 nm and about 580 nm, in correspondence with the characteristics of each of the color filters 24r, 24g, and 24r.

With the display light projection unit 10 described above, the display light projected from the display surface 20a of the liquid crystal panel 20 is incident on the light guide unit 30.

As shown in FIG. 2, the light guide unit 30 is an optical system that guides the display light from the display light projection unit 10 toward the projection window 2a, and configures a part of the optical path OP until the display light reaches the visual recognition region EB. The light guide unit 30 has a cold mirror unit 40 and a magnifying mirror unit 32.

The cold mirror unit 40 is located on the optical path OP of the display light on the display light projection unit 10 side than the magnifying mirror unit 32. The cold mirror unit 40 can reflect the display light with the use of an optical multilayer film 44. More specifically, the cold mirror unit 40 according to the present embodiment includes a single cold mirror 42.

The cold mirror 42 has a mirror substrate 43 and an optical multilayer film 44 and is used for virtual image display of an image. The mirror substrate 43 is made of, for example, synthetic resin or glass and is formed in a plate-like shape having a light transmissive property.

The optical multilayer film 44 is formed on a surface 42a on a display light incident side facing the display light projection unit 10 and the magnifying mirror unit 32 of the mirror substrate 43. The optical multilayer film 44 is formed by lamination of thin films 44a (also refer to FIG. 12) made of two or more types of optical materials each having a different refractive index along a direction normal to the surface. As the thin films 44a, dielectric thin films or metallic thin films may be used. As the optical material of the thin film 44a, for example, titanium oxide ($TiO_2$), silicon oxide ($SiO_2$), niobium oxide ($Nb_2O_5$), tantalum oxide ($Ta_2O_5$), magnesium fluoride ($MgF_2$), calcium fluoride ($CaF_2$), or the like may be used.

With such an optical multilayer film 44, the cold mirror 42 reflects a part of the display light incident from the display light projection unit 10 as an incident light, and blocks the other part from the optical path OP. In this example, the blocking from the optical path OP in the present embodiment includes that the display light passes through the optical multilayer film 44 and the mirror substrate 43 of the cold mirror 42 and is emitted outside the optical path OP, and that the display light is absorbed by using the optical multilayer film 44 or the mirror substrate 43. In the present embodiment, a ratio of transmission is sufficiently greater than the ratio of absorption.

The display light reflected by the cold mirror unit 40 is incident into the magnifying mirror unit 32.

The magnifying mirror unit 32 is located on the optical path OP of the display light and is closer to the projection window 2a (in other words, on the side of the windshield 3) than the cold mirror unit 40 is. The magnifying mirror unit 32 has a function of magnifying a size of the virtual image VI visually recognizable by the occupant relative to a size of the image on the display surface 20a in the display light projection unit 10. More specifically, the magnifying mirror unit 32 according to the present embodiment has one magnifying mirror 33.

The magnifying mirror 33 is formed on the surface of a substrate which includes a synthetic resin, a glass, or the like by depositing aluminum as a reflection surface 33a or the like. The reflection surface 33a is curved in a concave shape concaved in the center of the magnifying mirror 33 so as to be formed in a smooth concave surface shape. The display light incident on the magnifying mirror 33 is reflected towards the windshield 3 through the projection window 2a by the reflection surface 33a.

A part of the housing 50 which corresponds to the projection window 2a is provided with a light transmissive dustproof cover 52. Therefore, the display light from the light guide unit 30 passes through the dustproof cover 52 and is projected onto the windshield 3. In this way, the occupant can visually recognize the display light reflected by the windshield 3 as the virtual image VI.

Figure 7:
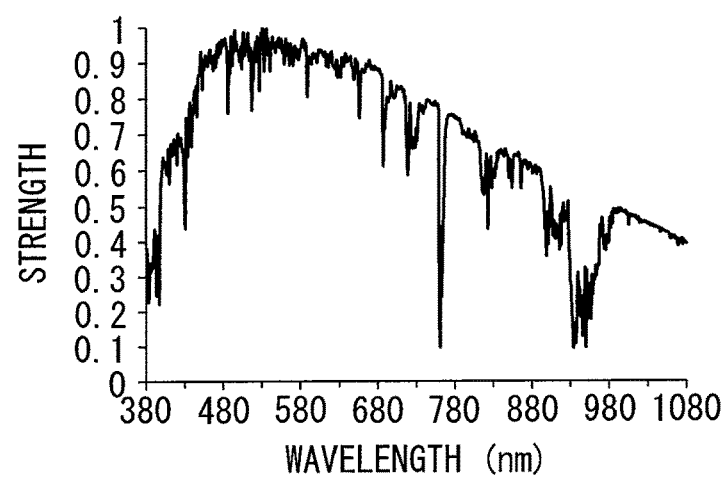
FIG. 7 is a graph showing a spectrum of sunlight.

In the vehicle 1 equipped with such an HUD device 100, for example, an external light such as sunlight passes through the windshield 3 and thereafter can additionally be incident on the inside of the HUD device 100 through the projection window 2a. Part of the external light entering the HUD device 100 from the projection window 2a is reflected by the magnifying mirror 33 of the magnifying mirror unit 32 in the light guide unit 30 along the optical path OP so as to be opposite to a progress of the display light, and then enters the cold mirror 42 of the cold mirror unit 40. FIG. 7 shows a spectrum of sunlight as the external light which can enter the cold mirror unit 40. The solar spectrum is small in wavelength dependence with respect to a spectrum of the display light in FIG. 6 and is widely gently distributed in the visible region and an infrared region.

If the cold mirror unit 40 has a characteristic that reflects a large amount of such sunlight toward the display light projection unit 10, the amount of sunlight reaching the display light projection unit 10 increases. The sunlight to reach the display light projection unit 10 is converted to, for example, heat, to damage the display light projection unit 10 and reduces the lifetime of the display light projection unit 10. In other words, it would be desirable that the cold mirror unit 40 has the characteristic small in the reflectance of sunlight.

On the other hand, since the cold mirror unit 40 also has a function to reflect the display light, it would be desired that the virtual image VI is displayed by the display light with high display quality.

Now, a description will be given of the degree of influence of each wavelength on the luminance and chromaticity of the display light having a spectrum in FIG. 6. As the XYZ color system in the following description, a CIE 1931 color system is applied. However, if there are special circumstances in which the application of the CIE 1931 color system becomes obviously inappropriate, such as when a distance from the eye point EP to the virtual image VI becomes very short, the CIE 1964 color system may be applied instead of the CIE 1931 color system. In addition, details of each color system may be referred to the ISO11664-1:2007.

Figure 8:
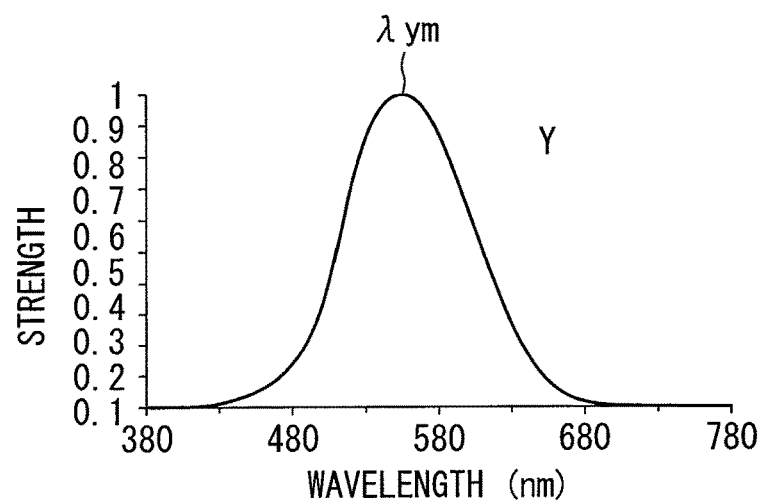
FIG. 8 is a graph showing a color matching function Y in an XYZ color system.
Figure 9:
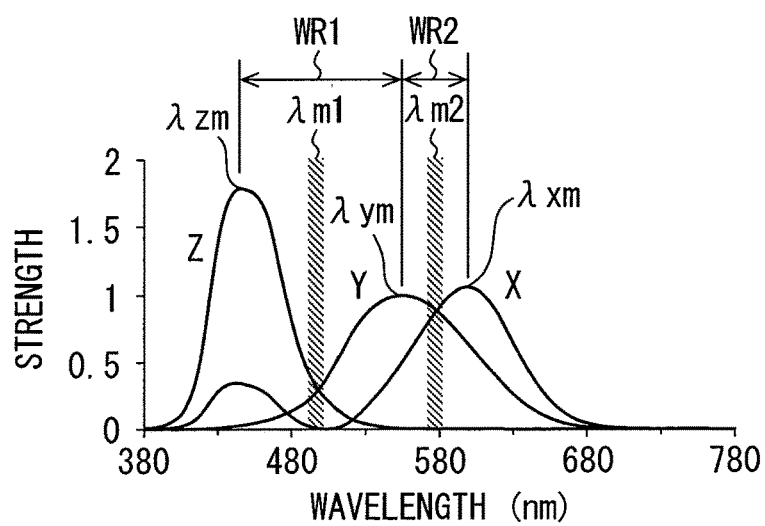
FIG. 9 is a graph showing a color matching function X, the color matching function Y and a color matching function Z in XYZ color system.

Further, for the following description, in the above-mentioned XYZ color system, as shown in FIGS. 8 and 9, a wavelength region between a wavelength $\lambda zm$ having a maximum value of the color matching function Z and a wavelength $\lambda ym$ having a maximum value of the color matching function Y is defined as a first wavelength region WR1, and a wavelength region between the wavelength $\lambda ym$ having the maximum value of the color matching function Y and a wavelength $\lambda xm$ having a maximum value of the color matching function X is defined as a second wavelength region WR2. In the CIE 1931 color system, the wavelength $\lambda xm$ is 599 nm, the wavelength $\lambda ym$ is 555 nm, and the wavelength $\lambda yz$ is 446 nm. Therefore, substantially, the first wavelength region WR1 corresponds to a range of 446 to 555 nm, and the second wavelength region WR2 corresponds to a range of 555 to 599 nm.

Furthermore, a wavelength exactly intermediate between the wavelength $\lambda zm$ with the maximum value of the color matching function Z and the wavelength $\lambda ym$ with the maximum value of the color matching function Y is defined as a first intermediate wavelength $\lambda m1$, and a wavelength exactly intermediate between the wavelength $\lambda ym$ with the maximum value of the color matching function Y and the wavelength $\lambda xm$ with the maximum value of the color matching function X is defined as a second intermediate wavelength $\lambda m2$. In the CIE 1931 color system, the first intermediate wavelength $\lambda m1$ is about 500 nm and the second intermediate wavelength $\lambda m2$ is about 580 nm.

Figure 10:
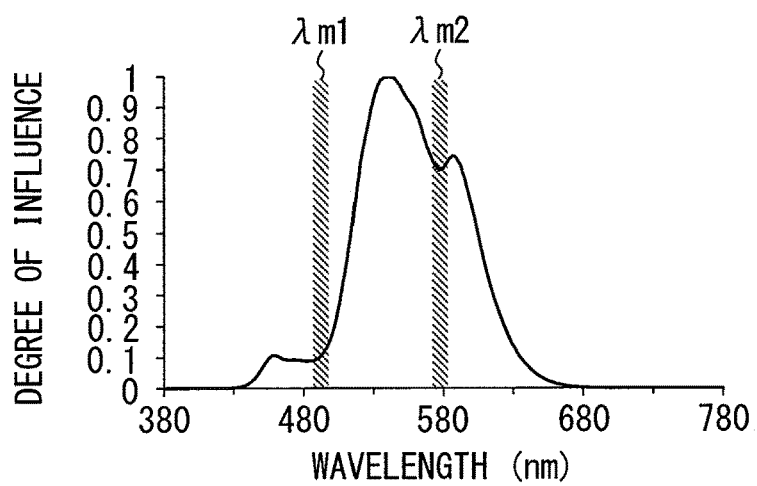
FIG. 10 is a graph showing a wavelength dependence of the degree of influence on a luminance in the display light according to the first embodiment.

The degree of influence on the luminance of each wavelength in the display light of the present embodiment may be expressed as shown in FIG. 10 by multiplying the color matching function Y of FIG. 8 by the spectrum of the display light of FIG. 6. In this example, since the display light includes the first wavelength region WR1 and the second wavelength region WR2, the degree of influence in each of the regions WR1 and WR2 is not 0 in FIG. 10. Specifically, referring to FIG. 10, the first wavelength region WR1 side from about 550 nm, which has the highest degree of influence, gradually decreases in the degree of influence, while the second wavelength region WR2 side maintains the degree of influence of 0.5 or more over the entire region. Therefore, the second wavelength region WR2 is larger in the degree of influence on the luminance than the first wavelength region WR1. The degree of influence of the first intermediate wavelength $\lambda m1$ is about 0.1, and the degree of influence of the second intermediate wavelength $\lambda m2$ is about 0.7. Therefore, the second intermediate wavelength $\lambda m2$ is larger in the degree of influence in the luminance than the first intermediate wavelength $\lambda m1$.

Figure 11:
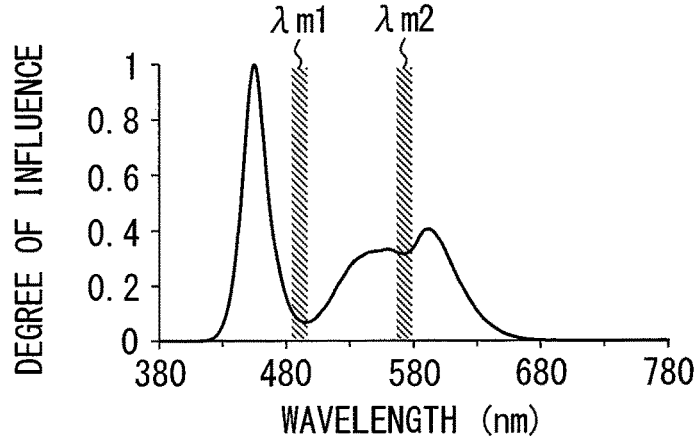
FIG. 11 is a graph showing the wavelength dependence of the degree of influence on chromaticity of the display light according to the first embodiment.

The degree of influence on the chromaticity of each wavelength in the display light according to the present embodiment may be expressed as shown in FIG. 11 by multiplying the color matching function X, the color matching function Y, and the color matching function Z of FIG. 9 by the spectrum of the display light of FIG. 6. FIG. 11 indicates that the first wavelength region WR1 has a region in which the degree of influence is equal to or less than 0.2 while the second wavelength region WR2 has the degree of influence which is equal to or larger than 0.3 over the entire region. Therefore, the second wavelength region WR2 has a greater degree of influence on chromaticity than the first wavelength region WR1. The degree of influence of the first intermediate wavelength $\lambda m1$ is about 0.1, and the degree of influence of the second intermediate wavelength $\lambda m2$ is about 0.3. Therefore, the second intermediate wavelength $\lambda m2$ is larger in the degree of influence on the chromaticity than the first intermediate wavelength $\lambda m1$.

When the reflectance in the wavelength region having a large degree of influence is set to be small with priority given to blocking the sunlight from the optical path OP, the light having the wavelength region in the display light is also blocked from the optical path OP by the cold mirror unit 40. When the light of the wavelength region having the large degree of influence in the display light is blocked, the influence on the display quality of the virtual image VI is large. Specifically, when the light having the wavelength region large in the degree of influence of luminance in the display light is blocked, the luminance of the virtual image VI is largely reduced, and when the light having the wavelength region larger in the degree of influence of chromaticity of the display light is blocked, the chromaticity of the virtual image VI greatly changes.

On the other hand, even if the reflectance in the wavelength region having a small degree of influence is reduced, the influence on the display quality of the virtual image VI is small. In such a wavelength region, there is little issue even if priority is given to blocking the sunlight from the optical path. Consequently, it would be reasonable to set the reflectance of the second wavelength region WR2 to be larger than the reflectance of the first wavelength region WR1. Similarly, it would be reasonable to set the reflectance of the second intermediate wavelength $\lambda m2$ to be larger than the reflectance of the first intermediate wavelength $\lambda m1$.

Figures 12, 13:
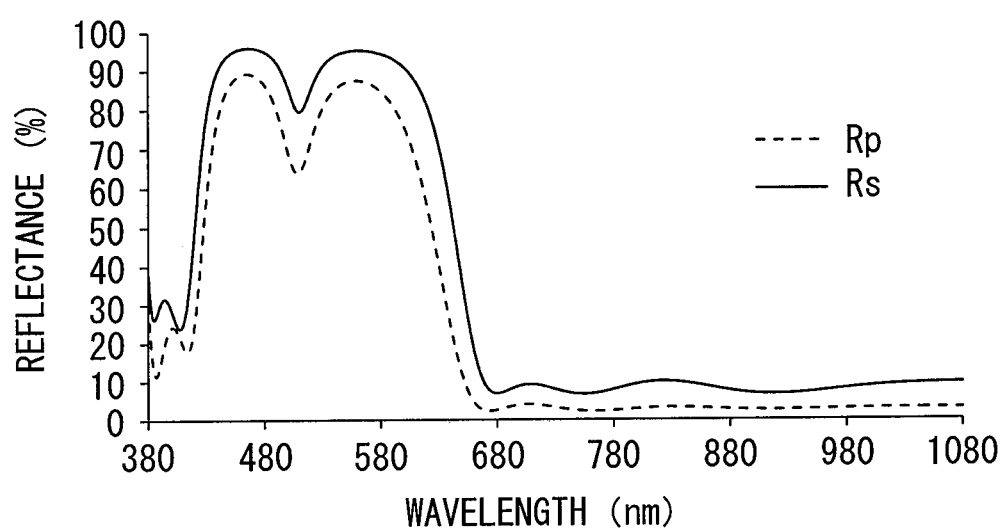
FIG. 12 is a diagram showing a detailed configuration of a cold mirror according to the first embodiment.
FIG. 13 is a graph showing a reflectance characteristic of a cold mirror unit according to the first embodiment.

In consideration of the degree of influence on the luminance and the degree of influence on the chromaticity, the cold mirror 42 according to the present embodiment employs the configurations of the mirror substrate 43 and the optical multilayer film 44 shown in FIG. 12. In a column on a left side of the optical multilayer film 44 in FIG. 12, an optical material of the thin films 44a is listed. In a column on a right side of the optical multilayer film 44 in FIG. 12, a film thickness of the thin films 44a is listed (a unit is nm). The refractive index of the mirror substrate 43 is, for example, 1.52 with respect to a line e.

The film thickness in each thin film 44a is appropriately set, for example, under conditions based on the above consideration by optimization calculation by using the computer. In particular, the optical multilayer film 44 in FIG. 12 is designed under the condition in which the light whose polarization direction is slanted about 45 degrees relative to the incident surface is made incident at an incident angle of about 35 degrees.

FIG. 13 shows the reflectance characteristic of the cold mirror 42 of the cold mirror unit 40 configured as shown in FIG. 12. In FIG. 13, the reflectances corresponding to the incident angle of about 35 degrees corresponding to the actual display light, that is, a reflectance for a p polarized light and a reflectance for an s polarized light are shown. In the present embodiment in which the display light is incident on the incident surface while the polarization direction of the display light is tilted about 45 degrees, a mean value of a reflectance Rp and a reflectance Rs may be referred to as the reflectance. The reflectances Rp and Rs shown in FIG. 13 are energy reflectances.

The reflectance characteristic of the cold mirror unit 40 is characterized by the result of a light interference in the optical multilayer film 44. For that reason, the reflectance of the cold mirror unit 40 is unlikely to obtain discrete values for wavelengths, except a case in which the number of films of the thin films 44a exceeds a conventional number of films and a case in which the influence of an absorption line specific to an optical material of the thin films 44a is remarkable. Therefore, the reflectance of the cold mirror unit 40 rarely takes a reflectance different extremely in wavelengths adjacent to each other. In other words, even if the reflectance is compared between the following two specific wavelengths, there is a high probability that the above comparison is also applied to the wavelength close to the specific wavelength.

In this example, the reflectance of the cold mirror unit 40 with respect to the display light, which takes the minimum value of the reflectances of the respective wavelengths in the subject wavelength region, is defined as a minimum reflectance. With the above definition, referring to FIG. 13, it can be seen that the minimum reflectance in the second wavelength region WR2 is larger than the minimum reflectance in the first wavelength region WR1.

Similarly to FIG. 13, the reflectance at the second intermediate wavelength $\lambda$m2 is greater than the reflectance at the first intermediate wavelength $\lambda$m1.

More specifically, the minimum reflectance in the first wavelength region WR1 and the reflectance at the first intermediate wavelength $\lambda$m1 are 80% or less, while the minimum reflectance in the second wavelength region WR2 and the reflectance at the second intermediate wavelength $\lambda$m2 are 80% or more. One wavelength whose reflectance is a minimum value is present in the first wavelength region WR1.

Also, it is found that, in the visible region, the reflectance characteristic of the cold mirror unit 40 has a negative correlation with the color matching function X, the color matching function Y, and the color matching function Z in FIG. 9, and/or the wavelength dependence of the degree of influence on the luminance in FIG. 10, and/or, the wavelength dependence of the degree of influence on the chromaticity in FIG. 11.

Referring to FIG. 13, it is found that a minimum reflectance in the infrared region is less than a mean reflectance in the visible region. Specifically, the mean reflectance in the wavelength region equal to or larger than 780 nm and equal to or less than 1080 nm as the infrared region is 20% or less.

(Operational Effects)

The operations and effects of the first embodiment described above will be described hereinafter.

According to the HUD device 100 of the first embodiment, the minimum reflectance in the second wavelength region WR2 is larger than the minimum reflectance in the first wavelength region WR1. With the above configuration, in the first wavelength region WR1, since the minimum reflectance is small, the display light is unlikely to be reflected by the cold mirror unit 40, and therefore the display light is unlikely to be guided toward the projection window 2a. However, the degree of influence on the virtual image VI is relatively small. Even if the light of the first wavelength region WR1 of the external light such as the sunlight enters the HUD device 100 through the projection window 2a, the light is hardly reflected by the cold mirror unit 40 so that the light is restricted from reaching the display light projection unit 10. On the other hand, in the second wavelength region WR2 having a relatively large degree of influence on the virtual image VI, since the minimum reflectance is large, the display light is likely to be reflected by the cold mirror unit 40. Therefore, with the projection of the light onto the windshield 3 as a projection member, a large amount of the display light in the second wavelength region WR2 can contribute to the display of the virtual image VI. Therefore, the luminance and the color reproducibility of the virtual image VI are enhanced. With the above configuration, as a result that the cold mirror unit 40 having the reflectance characteristic in consideration of the color matching functions X, Y, and Z in the XYZ color system is adopted, the high display quality in the virtual image VI may be produced.

According to the first embodiment, the reflectance at the second intermediate wavelength $\lambda$m2 is larger than the reflectance at the first intermediate wavelength $\lambda$m1. With the above configuration, in the vicinity of the first intermediate wavelength $\lambda$m1, since the reflectance is small, the display light is unlikely to be reflected by the cold mirror unit 40, and therefore the display light is unlikely to be guided toward the projection window 2a. However, its degree of influence on the virtual image VI is relatively small. Even if the light of the first intermediate wavelength $\lambda$m1 of the external light such as the sunlight enters the HUD device 100 through the projection window 2a, the light is hardly reflected by the cold mirror unit 40 so that the light is restricted from reaching the display light projection unit 10. On the other hand, in the vicinity of the second intermediate wavelength $\lambda$m2 having a relatively large degree of influence on the virtual image VI, since the reflectance is large, the display light is likely to be reflected by the cold mirror unit 40, and therefore, with the projection of the display light onto the windshield 3, a large amount of the display light having a wavelength in the vicinity of the second intermediate wavelength $\lambda$m2 can contribute to the display of the virtual image VI. Therefore, the luminance and the color reproducibility of the virtual image VI are enhanced. With the above configuration, as a result that the cold mirror unit 40 having the reflectance characteristic in consideration of the color matching functions X, Y, and Z in the XYZ color system is adopted, the high display quality in the virtual image VI may be produced.

In addition, according to the first embodiment, the mean reflectance of wavelengths in the infrared region is less than the mean reflectance of wavelengths in the visible region. In the reflectance characteristic of the cold mirror unit 40 described above, even if the light in the infrared region of the external light such as the sunlight enters the HUD device 100 through the projection window 2a, the light is hardly reflected by the cold mirror unit 40 so that the light is restricted from reaching the display light projection unit 10. On the other hand, since the display light including the wavelength in the visible region may be reflected relatively much by the cold mirror unit 40, a large amount of the display light can contribute to the display of the virtual image VI.

In addition, according to the first embodiment, the mean reflectance of wavelengths in the wavelength region equal to or larger than 780 nm and equal to or less than 1080 nm as the infrared region is equal to or less than 20%. In this way, the cold mirror unit 40 can surely function, and the light in the infrared region of the external light hardly more reach the display light projection unit 10.

According to the cold mirror 42 of the first embodiment, the minimum reflectance in the second wavelength region WR2 is larger than the minimum reflectance in the first wavelength region WR1. The cold mirror 42 described above can reflect a large amount of light in the second wavelength region WR2 relatively large in the degree of influence on the display of the image in the incident light, while the cold mirror 42 can block a large amount of light of the first wavelength region WR1 relatively small in the degree of influence in the incident light. In other words, a heat generation cause may be restricted by blocking while the light in the second wavelength region WR2 large in the degree of influence can contribute to the display of the image. Therefore, since the luminance and color reproducibility in a display of the image is excellent, high display quality may be produced.

According to the first embodiment, the reflectance at the second intermediate wavelength $\lambda$m2 is larger than the reflectance at the first intermediate wavelength $\lambda$m1. The cold mirror 42 described above can reflect a large amount of light in a wavelength in the vicinity of the second intermediate wavelength $\lambda$m2 relatively large in the degree of influence on the display of the image in the incident light, while the cold mirror 42 can block a large amount of light in a wavelength in the vicinity of the first intermediate wavelength λm1 relatively small in the degree of influence in the incident light. In other words, a heat generation cause may be restricted by blocking while the light in the wavelength in the vicinity of the second intermediate wavelength λm2 large in the degree of influence can contribute to the display of the image. Therefore, since the luminance and color reproducibility in a display of the image is excellent, high display quality may be produced.

Second Embodiment

Figure 14:
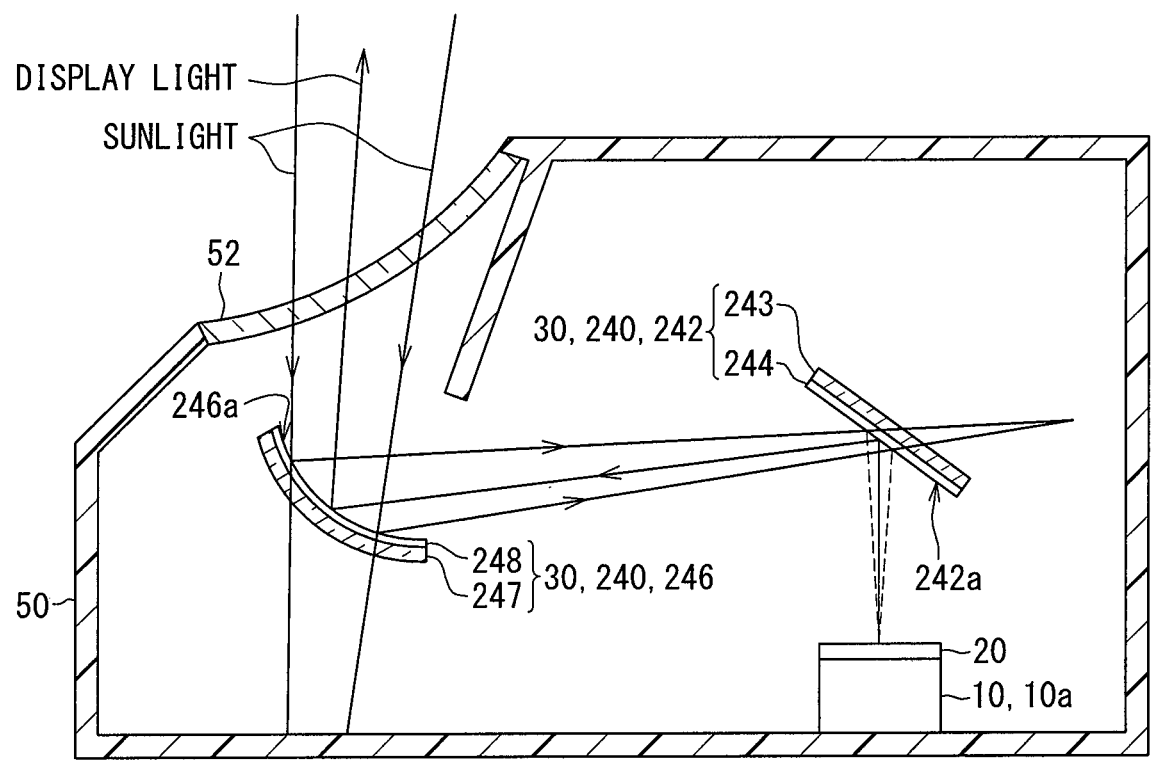
FIG. 14 is a diagram showing a schematic configuration of an HUD device according to a second embodiment.
Figure 15:
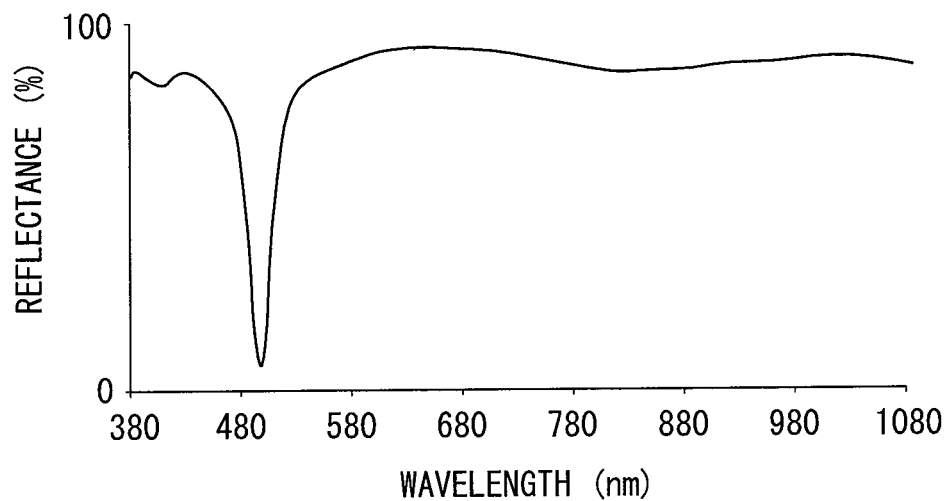
FIG. 15 is a graph showing a reflectance characteristic of a second wavelength region blocking mirror according to the second embodiment.
Figure 16:
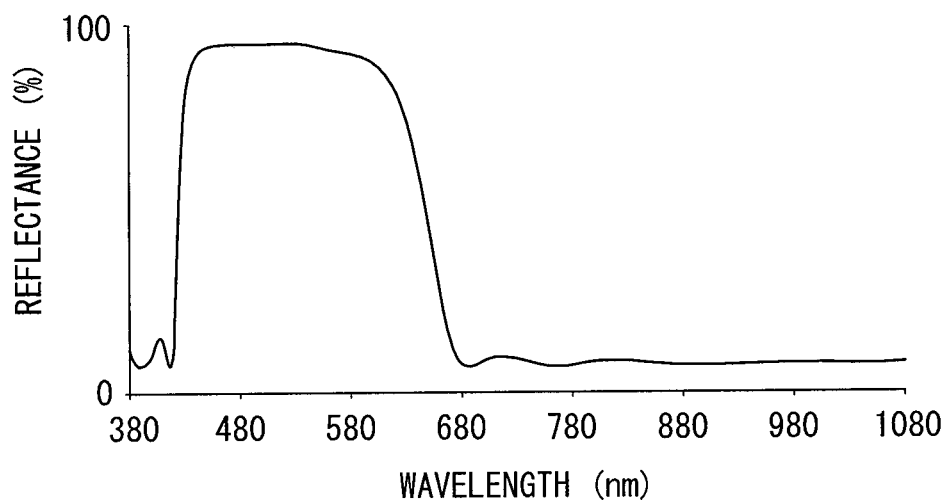
FIG. 16 is a graph showing a reflectance characteristic of an infrared region blocking mirror according to the second embodiment.

As shown in FIGS. 14 to 16, a second embodiment of the present disclosure is a modification of the first embodiment. The second embodiment will be described focusing on points different from the first embodiment.

As shown in FIG. 14, a cold mirror unit 240 according to the second embodiment has a second wavelength region blocking mirror 242 and an infrared region blocking mirror 246.

The second wavelength region blocking mirror 242 is located closer to a display light projection unit 10 than the infrared region blocking mirror 246 on an optical path OP of the display light. The second wavelength region blocking mirror 242 has a mirror substrate 243 and an optical multilayer film 244. The mirror substrate 243 is made of, for example, synthetic resin or glass and is formed in a plate-like shape having a light transmissive property.

The optical multilayer film 244 is formed on a surface 242a on a display light incident side facing the display light projection unit 10 and the infrared region blocking mirror 246 in the mirror substrate 243. An optical material of the optical multilayer film 244 can employ the same configuration as that of the optical multilayer film 44 in the first embodiment, and the optical multilayer film 244 is different from the optical multiplayer film 44 in the first embodiment in number of layers of thin films 44a and a film thickness of each thin film 44a. As a result, the reflectance characteristic of the second wavelength region blocking mirror 242 differs from the reflectance characteristic of the cold mirror 42 in the first embodiment.

Specifically, as schematically illustrated in FIG. 15, in the second wavelength region blocking mirror 242, a mean reflectance of wavelengths in the second wavelength region WR2 is less than a mean reflectance of wavelengths in a visible region except a second wavelength region WR2. Therefore, the second wavelength region blocking mirror 242 has a characteristic that easily blocks the light in the second wavelength region WR2 from the optical path OP in the visible region except for the second wavelength region WR2. On the other hand, the second wavelength region blocking mirror 242 has a high reflectance similar to the mean reflectance of wavelengths in the visible region except for the second wavelength region WR2 even in the infrared region.

The infrared region blocking mirror 246 is located on the optical path OP of the display light on the projection window 2a side (in other words, windshield 3 side) than the second wavelength region blocking mirror 242. The infrared region blocking mirror 246 has a mirror substrate 247 and an optical multilayer film 248.

The mirror substrate 247 is made of, for example, synthetic resin or glass and is formed in a curved plate-shape having a light transmissive property. More specifically, in the mirror substrates 247, a surface 246a on a display light incident side facing the projection window 2a and the second wavelength region blocking mirror 242 is formed in a smooth concave surface by being curved in a concave shape where a center of the mirror substrate is concaved as a concave reflection surface. In other words, the infrared region blocking mirror 246 has a function of magnifying a size of a virtual image VI visually recognizable by an occupant relative to a size of the image on the display surface 20a in the display light projection unit 10. In the second embodiment, because the infrared region blocking mirror 246 also functions as the magnifying mirror unit 32 in the first embodiment, the magnifying mirror unit 32 is not provided separately.

The optical multilayer film 248 is formed on the surface 246a on the display light incident side. Although an optical material of the optical multilayer film 248 can employ the same configuration as that of the optical multilayer film 44 in the first embodiment, the optical multilayer film 44 in the first embodiment and the optical multilayer film 244 of the second wavelength region blocking mirror 242 are different from each other in number of layers of thin films 44a and a film thickness of each thin film 44a. As a result, the reflectance characteristic in the infrared region blocking mirror 246 differs from reflectance characteristic of the cold mirror 42 in the first embodiment and the reflectance characteristic of the second wavelength region blocking mirror 242.

Specifically, as schematically shown in FIG. 16, in the infrared region blocking mirror 246, the mean reflectance of wavelengths in the infrared region is smaller than the mean reflectance of wavelengths in the visible region. Consequently, the infrared region blocking mirror 246 has a characteristic that is easy to block the light in the infrared region from the optical path in the visible region. On the other hand, the infrared region blocking mirror 246 has a high reflectance similar to the mean reflectance of wavelengths in the visible region except for the second wavelength region WR2 even in the second wavelength region WR2. The reflectance characteristics shown in FIGS. 15 and 16 are a mean value of a reflectance Rs of an s polarized light and a reflectance Rp of a p polarized light.

The display light thus projected from the display light projection unit 10 may be guided to the second wavelength region blocking mirror 242 and infrared region blocking mirror 246 in order. Since the reflectance characteristic of the overall cold mirror unit 240 with respect to the display light is obtained by multiplying the reflectance characteristic of the second wavelength region blocking mirror 242 by the reflectance characteristic in the infrared region blocking mirror 246, the cold mirror unit 240 according to the second embodiment also has a reflectance characteristic according to the reflectance characteristic of the cold mirror unit 40 in the first embodiment. Therefore, the operations and effects similar to those of the first embodiment may be produced.

In addition, according to the second embodiment, in the infrared region blocking mirror 246, the mean reflectance of wavelengths in the infrared region is smaller than the mean reflectance in the visible region, and the light in the infrared region is blocked from the optical path of the display light. In the second wavelength region blocking mirror 242, the mean reflectance of wavelengths in the second wavelength region WR2 is less than the mean reflectance of wavelengths in the visible region except the second wavelength region WR2, and the light in the second wavelength region WR2 is blocked from the optical path OP. With the configuration of the cold mirror unit 240 by using such multiple mirrors, even if the external light such as sunlight enters the inside of the HUD device 100 through the projection window 2a, the external light is blocked at different locations for each wavelength region, so that the heat generation location may be dispersed. Thus, since a local increase in temperature may be restricted, the durability of the HUD device 100 is enhanced, and the display quality of the virtual image VI may be maintained over a long period of time.

In addition, according to the second embodiment, the second wavelength region blocking mirror 242 is located closer to the display light projection unit 10 than the infrared region blocking mirror 246 on the optical path OP. In this way, the light in the infrared region which is easily converted to heat of the external light such as sunlight may be blocked with a more distant location from the display light projection unit 10. At the same time, since the light of the second wavelength region WR2 in the display light may be blocked before a light beam is sufficiently spread in the light guide unit 30, the display quality of the virtual image VI may be enhanced.

In addition, according to the second embodiment, the infrared region blocking mirror 246 has the surface 246*a* as a concave reflection surface formed in a curved shape by curving into a concave shape. In this way, even if an element is not provided separately, since a size of the virtual image VI visibly recognizable may be enlarged, the display quality is enhanced.

OTHER EMBODIMENTS

Hereinbefore, multiple embodiments of the present disclosure are described. However, the present disclosure is not interpreted to be limited to the embodiments, and various embodiments and combinations thereof may be applied within a scope which does not depart from the gist of the present disclosure.

More specifically, in a first modification, a reflectance characteristic of a cold mirror unit 40 can employ various characteristics so far as the operational effects according to the first embodiment and the second embodiment are obtained.

Figure 17:
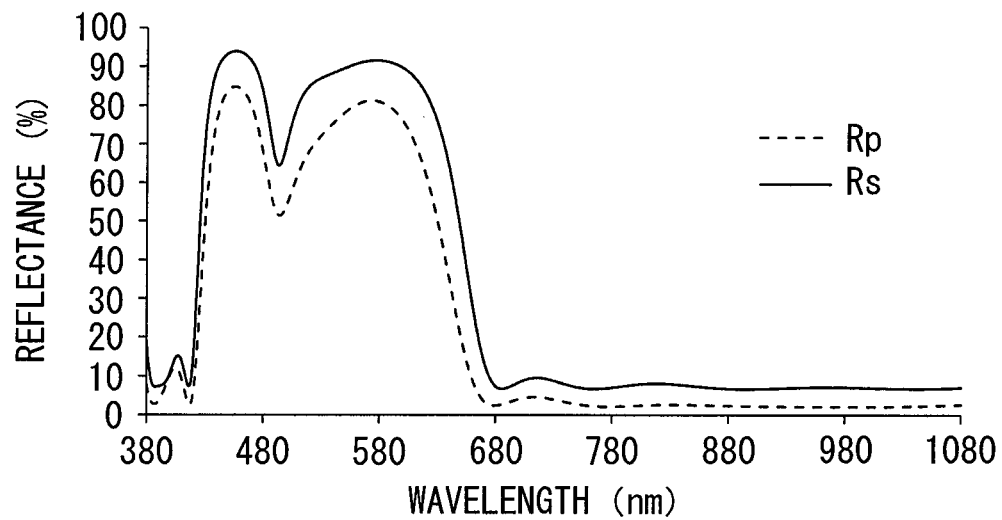
FIG. 17 is a graph showing a reflectance characteristic of a cold mirror unit according to one example of a first modification.

In an example shown in FIG. 17, the reflectance in an ultraviolet region, in particular, in a wavelength region of 380 to 400 nm is 20% or less.

Figure 18:
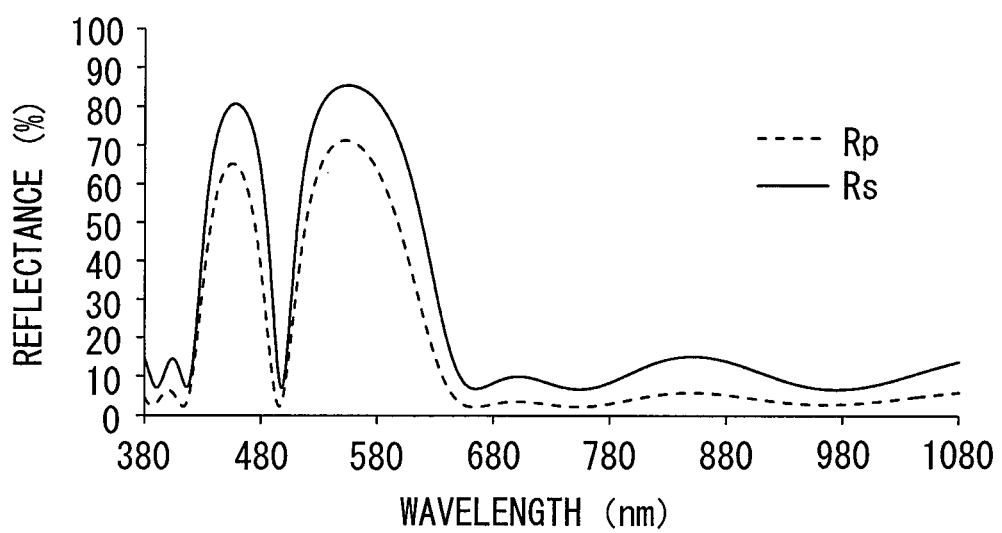
FIG. 18 is a graph showing a reflectance characteristic of a cold mirror unit according to another example of the first modification.

In an example shown in FIG. 18, the minimum reflectance in the first wavelength region WR1 and the reflectance at the first intermediate wavelength $\lambda m1$ are 20% or less, while the minimum reflectance in the second wavelength region WR2 and the reflectance at the second intermediate wavelength $\lambda m2$ are 60% or more.

Figure 19:
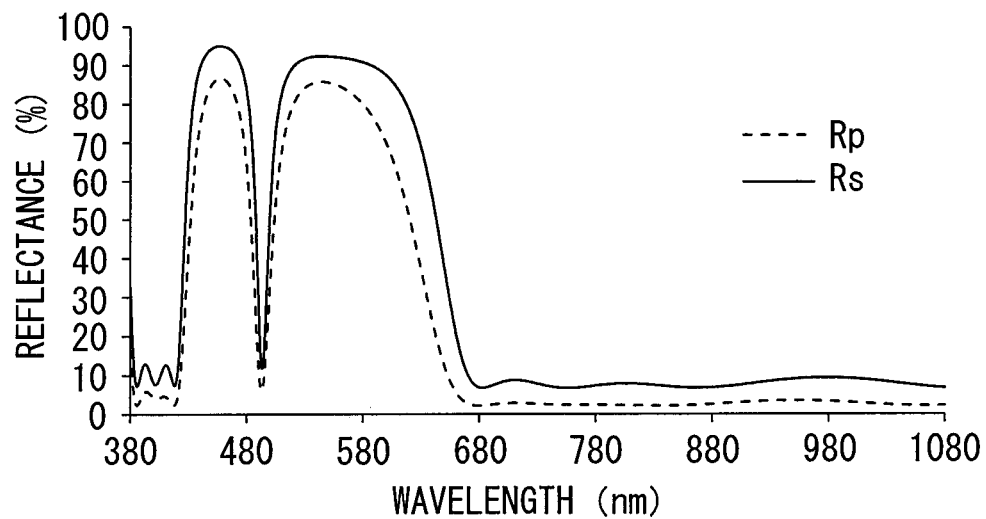
FIG. 19 is a graph showing a reflectance characteristic of a cold mirror unit according to still another example of the first modification.

In an example shown in FIG. 19, the minimum reflectance in the first wavelength region WR1 and the reflectance at the first intermediate wavelength $\lambda m1$ are 20% or less, while the minimum reflectance in the second wavelength region WR2 and the reflectance at the second intermediate wavelength $\lambda m2$ are 80% or more.

Figure 20:
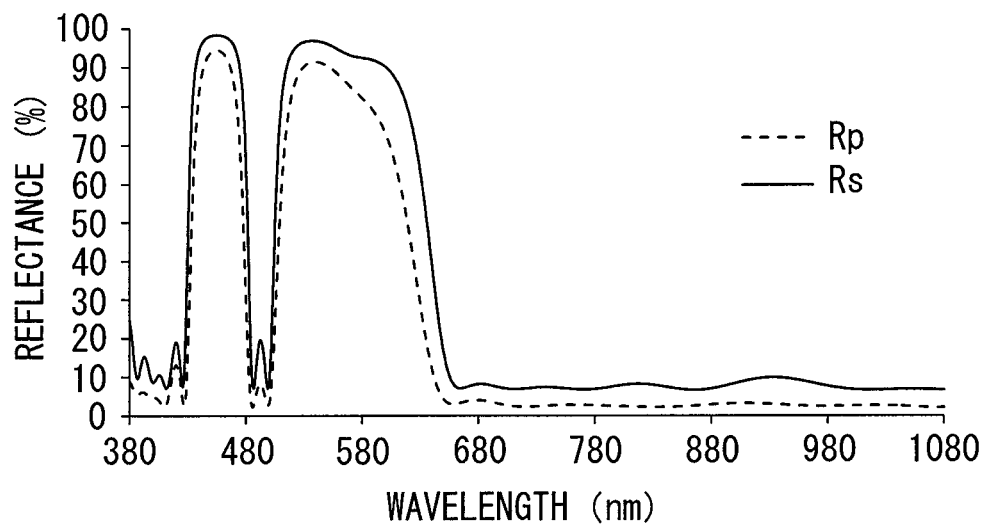
FIG. 20 is a graph showing a reflectance characteristic of a cold mirror unit according to yet another example of the first modification.

In an example shown in FIG. 20, two wavelengths in which the reflectance is a minimum value are present in the first wavelength region WR1, in addition to the example of FIG. 19. As a result, the reflectance is 20% or less in a wider region of the first wavelength region WR1.

In a second modification, in the cold mirror 42, the second wavelength region blocking mirror 242, or the infrared region blocking mirror 246, the polarization direction of the display light may not be incident with a tilt of about 45 degrees relative to a plane of incidence. For example, the display light of the s polarized light or the p polarized light may be incident on each of the mirrors 42, 242, and 246.

In a third modification, the optical multilayer films 44, 244, and 248 in the cold mirror 42, the second wavelength region blocking mirror 242, or the infrared region blocking mirror 246 may be formed on the surface of the mirror substrates 43, 243, and 247 on the opposite side to the surface 42*a*, 242*a*, and 246*a* on the incident side of the display light.

In a fourth modification related to the first embodiment, the cold mirror 42 may have the same reflectance characteristic as that of the second wavelength region blocking mirror 242 in the second embodiment. In other words, in the cold mirror unit 40, the mean reflectance in the infrared region may be equal to or larger than a mean reflectance in the visible region.

In a fifth modification related to the first embodiment, the cold mirror 42 may be formed in a curved plate-shape. More specifically, the surface 42*a* on the display light incident side may be formed in a smooth concave surface by curving a center of the mirror substrate 43 into a concave shape, or may be formed in a smooth convex surface by curving the center of the mirror substrate 43 into a convex shape.

In a sixth modification related to the second embodiment, the second wavelength region blocking mirror 242 may be located on the optical path OP of the display light on the projection window 2*a* side (in other words, on the windshield 3 side) in the infrared region blocking mirror 246.

In a seventh modification related to the second embodiment, at least one of the second wavelength region blocking mirror 242 and the infrared region blocking mirror 246 may have another shape. For example, in the second embodiment, the surface 242*a* of the second wavelength region blocking mirror 242 on the display light incident side may be formed in a smooth convex surface by being curved in a convex shape in which the center of the mirror substrate 243 is convex, as the convex reflection surface. In addition, for example, the infrared region blocking mirror 246 may have a concave reflection surface. In addition, for example, both of the second wavelength region blocking mirror 242 and the infrared region blocking mirror 246 may be formed in a plate-like shape.

In an eighth modification, the display light projection unit 10 can employ another configuration. For example, a color filter such as a yellow color filter may be added to a color filter of the liquid crystal panel 20 in addition to the filters of red, green, and blue. In that case, since the yellow color filter causes the degree of influence of the wavelength in the vicinity of 580 nm in the display light to synergistically increase, the application effect of the cold mirror unit 40 is synergistically enhanced. In addition, for example, the liquid crystal panel 20 may not be provided with the color filters, and the display light projection unit may project a white light.

In addition, the display light projection unit 10 without using the liquid crystal panel 20 may be adopted. As this example, a laser scanner system that scans a scanning direction of the scanning mirror on which laser light beam is incident, forms an image on a screen, and projects the image as the display light may be employed. The display light projected from the display light projection unit 10 may not be the polarized light.

In a ninth modification, the present disclosure may be applied to various mobile objects (transportation equipment) such as vessels or aircraft other than the vehicle 1.

In a tenth modification, the cold mirror 42 may be applied to devices other than the HUD device 100 so far as the cold mirror 42 is used for display of the image.

The head-up display device described above is mounted on the mobile body 1 and projects the display light onto the projection member 3 through the projection window 2*a*, to thereby virtually display the image visibly recognizable by the occupant. The head-up display device includes the display light projection unit 10 and the light guide unit 30. The display light projection unit 10 projects the image as the display light which includes multiple wavelengths in the visible region. The light guide unit 30 guides the display light from the display light projection unit to the projection window side. The light guide unit has the cold mirror units 40 and 240 that reflect the display light with the use of the optical multilayer films 44, 244, and 248. In the XYZ color system, a wavelength region between a wavelength $\lambda zm$ at which a value of a color matching function Z is maximum and a wavelength $\lambda ym$ at which a value of the color matching function Y is maximum is defined as the first wavelength region WR1. In the XYZ color system, the wavelength region between the wavelength at which the color matching function Y is maximum and the wavelength $\lambda xm$ at which the color matching function X is maximum is defined as the second wavelength region WR2. The reflectance of the cold mirror unit with respect to the display light, which takes the minimum value of the reflectances of the respective wavelengths in the subject wavelength region, is defined as a minimum reflectance. The minimum reflectance in the second wavelength region is larger than the minimum reflectance in the first wavelength region.

According to the above disclosure, the minimum reflectance in the second wavelength region is larger than the minimum reflectance in the first wavelength region. With the above configuration, in the first wavelength region, since the minimum reflectance is small, the display light is unlikely to be reflected by the cold mirror unit, and therefore the display light is unlikely to be guided to the projection window side. However, the degree of influence on the virtual image is relatively small. Even if the light of the first wavelength region of the external light such as the sunlight enters the HUD device through the projection window, the light is hardly reflected by the cold mirror unit so that the light is restricted from reaching the display light projection unit. On the other hand, in the second wavelength region having a relatively large degree of influence on the virtual image, since the minimum reflectance is large, the display light is likely to be reflected by the cold mirror unit. Therefore, with the projection of the light onto the projection member, a large amount of the display light in the second wavelength region can contribute to the display of the virtual image. Therefore, the luminance and the color reproducibility of the virtual image are enhanced. With the above configuration, as a result that the cold mirror unit having the reflectance characteristic in consideration of the color matching functions X, Y, and Z in the XYZ color system is adopted, the high display quality in the virtual image may be produced.

In addition, the head-up display device according to another disclosure described above is mounted on the mobile body 1 and projects the display light onto the projection member 3 through the projection window 2a, to thereby virtually display the image visibly recognizable by the occupant. The display light projection unit 10 projects the image as the display light which includes multiple wavelengths in the visible region. The light guide unit 30 guides the display light from the display light projection unit to the projection window side. The light guide unit has the cold mirror units 40 and 240 that reflect the display light with the use of the optical multilayer films 44, 244, and 248. In the XYZ color system, a wavelength just intermediate between the wavelength $\lambda zm$ at which the value of the color matching function Z is maximum and the wavelength $\lambda ym$ at which the value of the color matching function Y is maximum is defined as the first intermediate wavelength $\lambda m1$. In addition, in the XYZ color system, a wavelength just intermediate between the wavelength at which the value of the color matching function Y is maximum and the wavelength $\lambda xm$ at which the value of the color matching function X is maximum is defined as the second intermediate wavelength $\lambda m2$. In the reflectance of the cold mirror unit for display light, the reflectance at the second intermediate wavelength is larger than the reflectance at the first intermediate wavelength.

According to the above configuration, the reflectance at the second intermediate wavelength is larger than the reflectance at the first intermediate wavelength. With the above configuration, in the vicinity of the first intermediate wavelength, since the reflectance is small, the display light is unlikely to be reflected by the cold mirror unit, and therefore the display light is unlikely to be guided to the projection window side. However, the degree of influence on the virtual image is relatively small. Even if the light in the wavelength close to the first intermediate wavelength of the external light such as the sunlight enters the HUD device through the projection window, the light is hardly reflected by the cold mirror unit so that the light is restricted from reaching the display light projection unit. On the other hand, in the second intermediate wavelength having a relatively large degree of influence on the virtual image, since the reflectance is large, the display light is likely to be reflected by the cold mirror unit. Therefore, with the projection of the light onto the projection member, a large amount of the display light in the wavelength close to the second wavelength can contribute to the display of the virtual image. Therefore, the luminance and the color reproducibility of the virtual image are enhanced. With the above configuration, as a result that the cold mirror unit having the reflectance characteristic in consideration of the color matching functions X, Y, and Z in the XYZ color system is adopted, the high display quality in the virtual image may be produced.

In addition, the cold mirror according to another disclosure described above includes the mirror substrate 42 and the optical multilayer film 44. The mirror substrate 42 is used to display the image. The optical multilayer film 44 is formed on the surface 42a of the mirror substrate. The cold mirror reflects a part of the incident light by using the optical multilayer film and blocks the other part from the optical path OP. In the XYZ color system, a wavelength region between a wavelength $\lambda zm$ at which a value of a color matching function Z is maximum and a wavelength $\lambda ym$ at which a value of the color matching function Y is maximum is defined as the first wavelength region WR1. In the XYZ color system, the wavelength region between the wavelength at which the value of the color matching function Y is maximum and the wavelength $\lambda xm$ at which the value of the color matching function X is maximum is defined as the second wavelength region WR2. In the reflectance of each wavelength in subject wavelength region, the minimum reflectance that takes the minimum value is defined. The minimum reflectance in the second wavelength region is larger than the minimum reflectance in the first wavelength region.

According to the above disclosure, the minimum reflectance in the second wavelength region is larger than the minimum reflectance in the first wavelength region. The cold mirror described above can reflect a large amount of light in the second wavelength region relatively large in the degree of influence on the display of the image in the incident light, while the cold mirror can block a large amount of light of the first wavelength region relatively small in the degree of influence in the incident light. In other words, a heat generation cause may be restricted by blocking while the light in the second wavelength region large in the degree of influence can contribute to the display of the image. Therefore, since the luminance and color reproducibility in a display of the image is excellent, high display quality may be produced.

In addition, the cold mirror according to another disclosure described above is used to display the image, and includes the mirror substrate 42 and the optical multilayer film 44 formed on the surface 42a of the mirror substrate. The cold mirror reflects a part of the incident light by using the optical multilayer film and blocks the other part from the optical path OP. In the XYZ color system, a wavelength just intermediate between the wavelength $\lambda zm$ at which the value of the color matching function Z is maximum and the wavelength $\lambda zm$ at which the value of the color matching function Y is maximum is defined as the first intermediate wavelength $\lambda m1$. In addition, in the XYZ color system, a wavelength just intermediate between the wavelength at which the value of the color matching function Y is maximum and the wavelength $\lambda xm$ at which the value of the color matching function X is maximum is defined as the second intermediate wavelength $\lambda m2$. In the reflectance with respect to the incident light, the reflectance at the second intermediate wavelength is larger than the reflectance at the first intermediate wavelength.

According to the above configuration, the reflectance at the second intermediate wavelength is larger than the reflectance at the first intermediate wavelength. The cold mirror described above can reflect a large amount of light in a wavelength in the vicinity of the second intermediate wavelength relatively large in the degree of influence on the display of the image in the incident light, while the cold mirror can block a large amount of light in a wavelength in the vicinity of the first intermediate wavelength relatively small in the degree of influence in the incident light. In other words, a heat generation cause may be restricted by blocking while the light in the wavelength in the vicinity of the second intermediate wavelength large in the degree of influence can contribute to the display of the image. Therefore, since the luminance and color reproducibility in a display of the image is excellent, high display quality may be produced.

The present disclosure has been described based on examples, but it is understood that the present disclosure is not limited to the examples or structures. The present disclosure includes various modification examples and modifications within the equivalent range. In addition, it should be understood that various combinations or aspects, or other combinations or aspects, in which only one element, one or more elements, or one or less elements are added to the various combinations or aspects, also fall within the scope or technical idea of the present disclosure.

What is claimed is:

1. A head-up display device configured to be mounted on a movable object and to project a display light through a projection window onto a projection member to display a virtual image visually recognizable by an occupant, the head-up display device comprising:

a display light projection projector configured to project an image as a display light, which includes a plurality of wavelengths, in a visible region; and a light guide configured to guide the display light from the display light projection projector toward the projection window, wherein the light guide includes a cold mirror unit configured to reflect the display light with an optical multilayer film, in an XYZ color system, a wavelength region between a wavelength having a maximum value of a color matching function Z and a wavelength having a maximum value of a color matching function Y is defined as a first wavelength region, and a wavelength region between the wavelength having the maximum value of the color matching function Y and a wavelength having a maximum value of a color matching function X is defined as a second wavelength region, a reflectance of the cold mirror unit to the display light, which takes a minimum value among reflectances in the first wavelength region is a minimum reflectance in the first wavelength region, a reflectance of the cold mirror unit to the display light, which takes a minimum value among reflectances in the second wavelength region is a minimum reflectance in the second wavelength region, and the minimum reflectance in the second wavelength region is larger than the minimum reflectance in the first wavelength region.

2. The head-up display device according to claim 1, wherein a mean reflectance of wavelengths in the infrared region is less than a mean reflectance of wavelengths in a visible region.

3. The head-up display device according to claim 2, wherein the mean reflectance of wavelengths in the wavelength region equal to or larger than 780 nm and equal to or less than 1080 nm as the infrared region is equal to or less than 20%.

4. The head-up display device according to claim 1, wherein the cold mirror unit includes:

an infrared region blocking mirror in which a mean reflectance of wavelengths in an infrared region is less than a mean reflectance in a visible region, the infrared region blocking mirror configured to block light in the infrared region from an optical path of the display light; and a second wavelength region blocking mirror in which a mean reflectance of wavelengths in the second wavelength region is smaller than a mean reflectance of wavelengths in a region other than the second wavelength region in the visible region, the second wavelength region blocking mirror configured to block light in the second wavelength region from the optical path.

5. The head-up display device according to claim 4, wherein the second wavelength region blocking mirror is located on the optical path and is closer to the display light projection projector than the infrared region blocking mirror is.

6. The head-up display device according to claim 4, wherein at least one of the infrared region blocking mirror and the second wavelength region blocking mirror has a concave reflection surface being a curved surface bent in a concave shape.

7. A head-up display device configured to be mounted on a movable object and to project a display light through a projection window onto a projection member to display a virtual image visually recognizable by an occupant, the head-up display device comprising:
- a display light projection projector configured to project an image as a display light, which includes a plurality of wavelengths, in a visible region; and
- a light guide configured to guide the display light from the display light projection projector toward the projection window, wherein
- the light guide includes a cold mirror unit configured to reflect the display light with an optical multilayer film,
- in an XYZ color system, a wavelength, which is intermediate between a wavelength at which a value of a color matching function Z is maximum and a wavelength at which a value of a color matching function Y is maximum, is defined as a first intermediate wavelength, and a wavelength, which is intermediate between a wavelength at which the value of the color matching function Y is maximum and a wavelength at which a value of a color matching function X is maximum, is defined as a second intermediate wavelength, and
- among reflectances of the cold mirror unit to the display light, a reflectance at the second intermediate wavelength is larger than a reflectance at the first intermediate wavelength.

8. A cold mirror configured to display an image, the cold mirror comprising:
- a mirror substrate; and
- an optical multilayer film formed on a surface of the mirror substrate and configured to reflect a part of an incident light and to block the other part of the incident light from an optical path, wherein
- in an XYZ color system, a wavelength region between a wavelength having a maximum value of a color matching function Z and a wavelength having a maximum value of a color matching function Y is defined as a first wavelength region, and a wavelength region between the wavelength having the maximum value of the color matching function Y and a wavelength having a maximum value of a color matching function X is defined as a second wavelength region,
- a minimum reflectance in the first wavelength region is a minimum value among reflectances in the first wavelength region,
- a minimum reflectance in the second wavelength region is a minimum value among reflectances in the second wavelength region, and
- the minimum reflectance in the second wavelength region is larger than the minimum reflectance in the first wavelength region.

9. A cold mirror configured to display an image, the cold mirror comprising:
- a mirror substrate; and
- an optical multilayer film formed on a surface of the mirror substrate and configured to reflect a part of an incident light and to block the other part of the incident light from an optical path, wherein
- in an XYZ color system, a wavelength that is intermediate between a wavelength at which a value of a color matching function Z is maximum and a wavelength at which a value of a color matching function Y is maximum is defined as a first intermediate wavelength, and a wavelength that is intermediate between a wavelength at which the value of the color matching function Y is maximum and a wavelength at which a value of a color matching function X is maximum is defined as a second intermediate wavelength, and
- among reflectances to the incident light, a reflectance at the second intermediate wavelength is larger than a reflectance at the first intermediate wavelength.

* * * * *